United States Patent
Hou et al.

(10) Patent No.: US 7,685,343 B2
(45) Date of Patent: Mar. 23, 2010

(54) DATA ACCESS METHOD FOR SERIAL BUS

(75) Inventors: Ching-Min Hou, Taichung County (TW); Kung-Hsien Chu, Chiayi County (TW)

(73) Assignee: ITE Tech. Inc., Hsinchu (TW)

( * ) Notice: Subject to any disclaimer, the term of this patent is extended or adjusted under 35 U.S.C. 154(b) by 414 days.

(21) Appl. No.: 11/692,932

(22) Filed: Mar. 29, 2007

(65) Prior Publication Data

US 2008/0155366 A1 Jun. 26, 2008

(30) Foreign Application Priority Data

Dec. 5, 2006 (TW) .............................. 95145118 A

(51) Int. Cl.
*G06F 13/00* (2006.01)
(52) U.S. Cl. ....................... 710/105; 710/106
(58) Field of Classification Search ................. 710/100, 710/105, 106
See application file for complete search history.

(56) References Cited

U.S. PATENT DOCUMENTS

| | | | | |
|---|---|---|---|---|
| 5,493,570 A | * | 2/1996 | Hillman et al. ............. 370/516 |
| 5,878,234 A | * | 3/1999 | Dutkiewicz et al. ......... 710/110 |
| 5,889,721 A | * | 3/1999 | Gannage ..................... 365/226 |
| 2004/0054852 A1 | * | 3/2004 | Nain et al. ................... 711/137 |
| 2008/0005408 A1 | * | 1/2008 | Yen et al. ...................... 710/58 |

* cited by examiner

*Primary Examiner*—Glenn A Auve
(74) *Attorney, Agent, or Firm*—Jianq Chyun IP Office

(57) ABSTRACT

A data access method for serial bus is provided. During a write/read cycle, the write/read cycle is divided into a plurality of transmitting intervals and a plurality of suspending intervals. In each of the transmitting intervals, a clock signal is transmitted on a clock pin and a data signal is transmitted on a data pin. In each of the suspending intervals, the clock signal stop being transmitted on the clock pin. In other words, the present invention uses an interrupted clock signal, such that an embedded controller can directly write a received data in a flash memory or directly output the data read from the flash memory, so as to avoid using a plurality of registers. Therefore, the present invention can decrease the cost of the embedded controller and reduce the area of the integrated circuit.

12 Claims, 5 Drawing Sheets

DATA ACCESS METHOD FOR SERIAL BUS

CROSS-REFERENCE TO RELATED APPLICATION

This application claims the priority benefit of Taiwan application serial no. 95145118, filed on Dec. 5, 2006. All disclosure of the Taiwan application is incorporated herein by reference.

BACKGROUND OF THE INVENTION

1. Field of the Invention

The present invention relates to a data access method, and more particularly to a data access method for serial bus.

2. Description of Related Art

A flash memory is a common storage element used on the mainboard, and has been broadly applied in the personal computers and notebooks. The flash memory can store various types of data, and can be controlled by an embedded controller such that other control chips on the mainboard can write data in the flash memory, or read the data stored in the flash memory. Taking the broadly applied computer architecture as an example, the embedded controller and the flash memory are connected through a Serial Peripheral Interface (SPI), and the embedded controller is also connected to a south bridge chip on the mainboard through a Low Pin Count Bus (LPC Bus).

When it is required to write data in the flash memory, the south bridge chip writes the data to the embedded controller with a write cycle in the LPC Bus, and after the embedded controller receives and stores the data transmitted from the south bridge chip, it writes the data in the flash memory with a programming cycle in the SPI.

In the conventional art, a plurality of bytes is written in each programming cycle such that the SPI can write the data in the flash memory effectively and rapidly. Taking writing 256 bytes in a programming cycle as an example, the timing of each pin in the SPI is as shown in FIG. 1. FIG. 1 is a timing diagram of the programming cycle of the SPI according to the conventional art.

Referring to FIG. 1, SCK, SCE#, SI, SO are all pins of the SPI, wherein a clock signal is on the SCK pin, an enable signal is on the SCE#, the data transmitted from the flash memory to the embedded controller is on the SO pin, and the data transmitted from the embedded controller to the flash memory is on the SI pin. It can be seen from FIG. 1 that, an instruction of 8 bits is transmitted on the SI pin first, and the instruction is transmitted by the embedded controller to the flash memory. Next, 24 bits transmitted on the SI pin is an initial address of the written data. Afterwards, the bits transmitted on the SI pin are all the data to be transmitted by the embedded controller to the flash memory.

It can be seen from the programming cycle that, the embedded controller writes the data of a plurality of bytes in each programming cycle. Therefore, a plurality of registers is built in the conventional embedded controller. After several write cycles in the LPC Bus, the data of a plurality of bytes from the south bridge chip is stored in the plurality of registers, such that the embedded controller can write the data of a plurality of bytes in the flash memory in the same programming cycle.

Similarly, when it is required to read the data in the flash memory, the embedded controller receives the data of a plurality of bytes in the flash memory in the same cycle, stores the data in the internal registers, and then output the data of a plurality of bytes in the plurality of registers to the south bridge chip through several read cycles in the LPC Bus.

However, as a plurality of registers must be built in the embedded controller to transmit the data of a plurality of bytes in one cycle. Moreover, when the data transmission volume predetermined in the cycle increases, the number of registers in the embedded controller increases, such that the registers waste a large amount of cost of the embedded controller. Additionally, the plurality of registers in the embedded controller also causes a large area of the integrated circuit.

SUMMARY OF THE INVENTION

Accordingly, the present invention is directed to providing a data access method for serial bus, such that an embedded controller can directly write the received data in a flash memory, thereby avoiding a design of a register for the embedded controller in hardware.

As embodied and broadly described herein, the present invention provides a data access method for serial bus, which comprises providing a clock pin and a data pin. During a write/read cycle, the write/read cycle is divided into a plurality of transmitting intervals and a plurality of suspending intervals. In each of the transmitting intervals, a clock signal is transmitted on the clock pin, and a data signal is transmitted on the data pin. In each of the suspending intervals, the clock signal stops being transmitted on the clock pin.

In the data access method for serial bus according to an embodiment of the present invention, the method further comprises providing an enable pin, starting the write/read cycle when a signal on the enable pin is enabled, and ending the write/read cycle when the signal on the enable pin is disabled.

In the data access method for serial bus according to an embodiment of the present invention, the serial bus is connected to an embedded controller and a flash memory, and the clock signal on the clock pin is driven by the embedded controller. When the signal on the enable pin is enabled and the clock signal is transmitted on the clock pin, the flash memory reads the data signal on the data pin through the clock signal.

The present invention further provides a data access method for serial bus, which comprises providing a clock pin, a data pin, and a control pin, wherein a clock signal is transmitted on the clock pin. During a write/read cycle, the write/read cycle is divided into a plurality of transmitting intervals and a plurality of suspending intervals. In each of the transmitting intervals, a signal on the control pin is enabled, and a data signal is transmitted on the data pin. In each of the suspending intervals, the signal on the control pin is disabled.

In the data access method for serial bus according to another embodiment of the present invention, the method further comprises providing an enable pin, starting the write/read cycle when a signal on the enable pin is enabled, and ending the write/read cycle when the signal on the enable pin is disabled.

In the data access method for serial bus according to another embodiment of the present invention, the serial bus is connected to an embedded controller and a flash memory, and the signal on the control pin is driven by the embedded controller. When the signals on the enable pin and the control pin are enabled simultaneously, the flash memory reads the data signal on the data pin through the clock signal.

As an interrupted clock signal is adopted in the present invention, the embedded controller can directly write the received data in the flash memory, thereby avoiding the design of a register on hardware, so as to decrease the cost of the embedded controller and reduce the area of the integrated circuit.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the conventional art, a plurality of registers must be built in an embedded controller, resulting in the increase the cost of the embedded controller. Therefore, an embedded controller is provided in an embodiment of the present invention to realize a data access method for serial bus, so as to read or write data from/in a flash memory without building registers in the embedded controller.

The embedded controller provided in the embodiment of the present invention is coupled to the flash memory with a serial bus, and the other end thereof is further coupled to other control chips on the mainboard. For the convenience of illustration, the embedded controller is assumed to be connected to a south bridge chip on the mainboard with a Low Pine Count Bus (LPC Bus), and the serial bus connected between the embedded controller and the flash memory is the Serial Peripheral Interface (SPI). Subsequently, the operating principle of the embedded controller according to an embodiment of the present invention using the SPI to write data in the flash memory is illustrated below.

Figure 1:
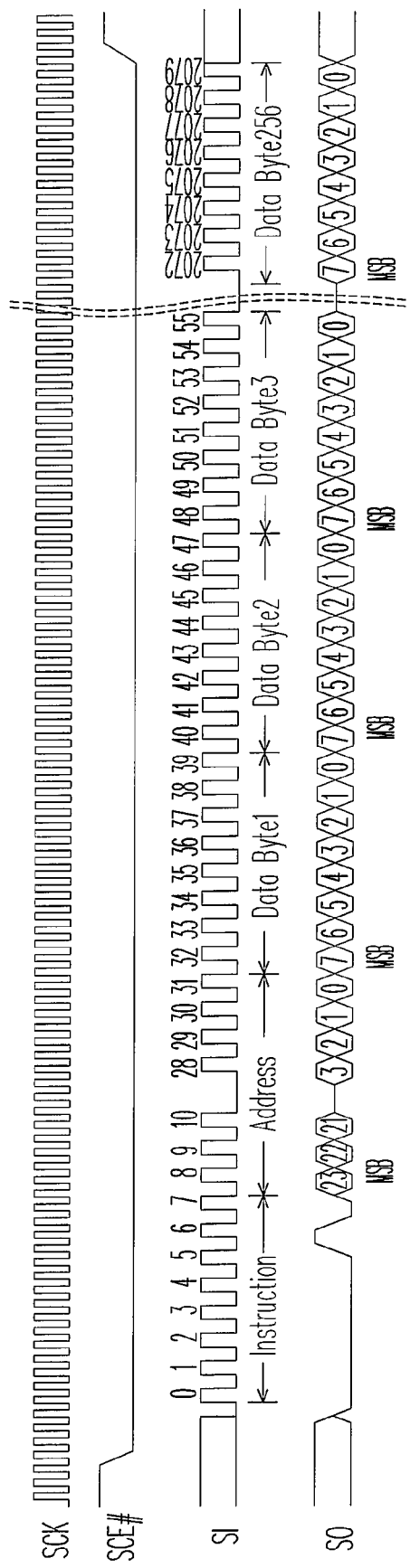
FIG. 1 is a timing diagram of the programming cycle of the SPI according to the conventional art.
Figure 2:
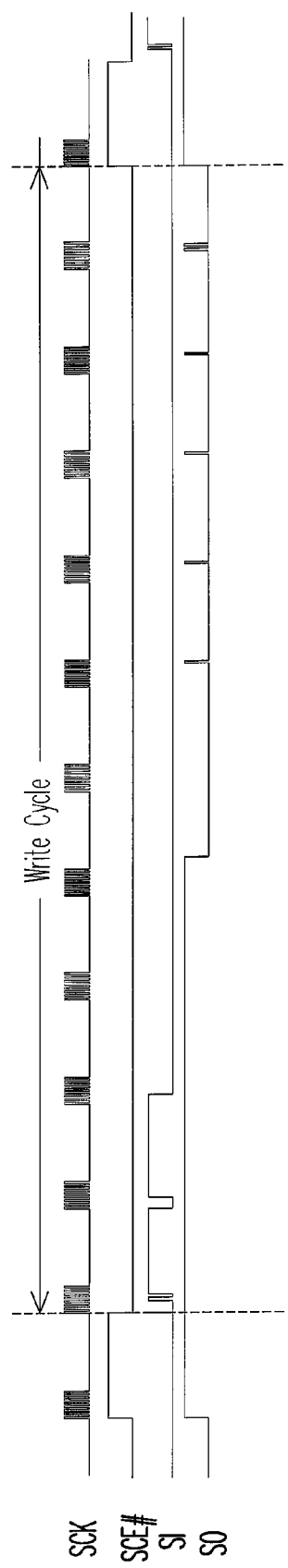
FIG. 2 is a timing diagram of the programming cycle of the SPI according to an embodiment of the present invention.

FIG. 2 is a timing diagram of the programming cycle of the SPI according to an embodiment of the present invention. Referring to FIG. 2, SCK, SCE#, SI, SO are all pins of the SPI, wherein a clock signal is on the SCK pin, an enable signal is on the SCE#, the data transmitted from the flash memory to the embedded controller is on the SO pin, and the data transmitted from the embedded controller to the flash memory is on the SI pin. In FIG. 2, a complete programming cycle (also referred to as write cycle) of the SPI is included, the starting of the programming cycle is the time when the SCE# pin is at a low voltage logic level, and the ending of the programming cycle is the time when the SCE# pin returns to a high voltage logic level. In a complete programming cycle, the embedded controller transmits a write instruction, an initial address of the flash memory to be written in, and the data to be written in the flash memory.

The clock signal on the SCK pin in the SPI is driven by the embedded controller. It can be seen from FIG. 2 that the embedded controller of this embodiment drives an interrupted clock signal transmitted on the SCK pin. During the programming cycle, only when the flash memory reads a clock signal on the SCK pin, the flash memory reads the data on the SI pin according to the clock signal on the SCK pin. Therefore, in this embodiment, as long as the embedded controller reads data from the south bridge chip, the clock signal transmitted on the SCK pin can be driven directly, and at the same time, the data received by the south bridge chip is written in the flash memory with the SI pin.

It can be known from the above embodiment that the clock signal driven by the embedded controller provided in the embodiment of the present invention is an interrupted signal. Therefore, each time when the LPC Bus of the embedded controller receives a byte data of the south bridge chip, the embedded controller can directly write the byte data in the flash memory. In other words, the difference between the embedded controller provided in the embodiment of the present invention and the embedded controller of the conventional art lies in that the embedded controller provided in the embodiment of the present invention does not need to store a plurality of byte data and write the plural batch of data in the flash memory in the same programming cycle. Instead, each time after the embedded controller receives the data from the south bridge chip, the received data is directly written in the flash memory. Therefore, the embedded controller provided in the embodiment of the present invention avoids the design of registers on hardware, thereby reducing the cost of the embedded controller and the area of the integrated circuit.

Similarly, when the embedded controller employs the SPI to read the data in the flash memory, during the same read cycle, the interrupted clock signal can also be used to directly output the byte data to the south bridge chip each time a byte data in the flash memory is read out. Consequently, the plurality of registers are not needed, and the cost of the embedded controller is reduced.

Figure 3:
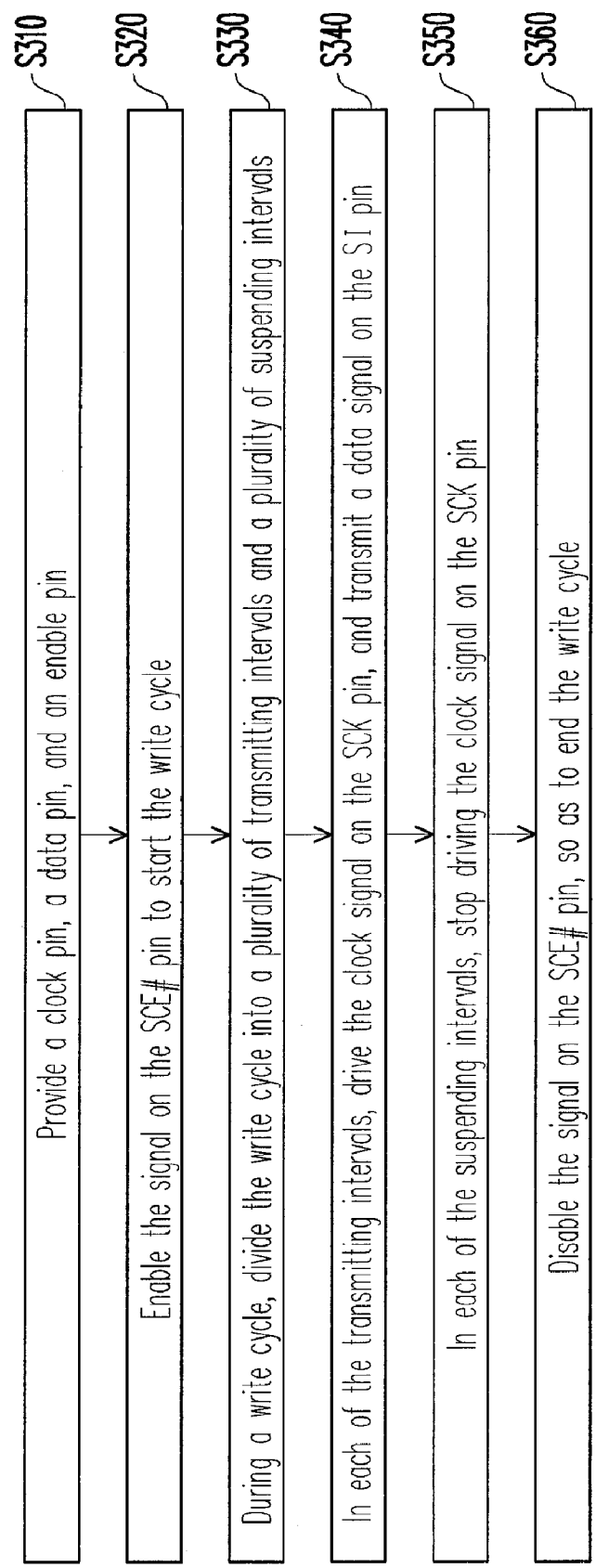
FIG. 3 is a flow chart of the processes of the data access method for serial bus according to an embodiment of the present invention.

A data access method for serial bus can be deduced from the above embodiment, and the flow thereof is as shown in FIG. 3. FIG. 3 is a flow chart of the processes of the data access method for serial bus according to an embodiment of the present invention. Referring to FIGS. 2 and 3 together, first, a clock pin, a data pin, and an enable pin are provided (step S310). The clock pin is, for example, the SCK pin in FIG. 2, the data pin is, for example, the SI and SO pins in FIG. 2, and the enable pin is, for example, the SCE# pin in FIG. 2. For the convenience of illustration, the embedded controller, for example, writes data in the flash memory. However, those of ordinary skill in the art should know that the data access method for serial bus of this embodiment can also be used for the embedded controller to read data in the flash memory.

Next, the embedded controller enables the signal on the SCE# pin, so as to start the write cycle (or referred to as programming cycle) (step S320). In FIG. 2, the method for the embedded controller to enable the signal on the SCE# pin is, for example, placing the signal at a low voltage logic level.

Then, during a write cycle, the write cycle is divided into a plurality of transmitting intervals and a plurality of suspending intervals (step S330). In each of the transmitting intervals, the embedded controller drives the clock signal on the SCK pin, and transmits a data signal on the SI pin (step S340). At this time, the flash memory also receives the clock signal on the SCK pin, and reads the data signal on the SI pin according to the clock signal. On the contrary, in each of the suspending intervals, the embedded controller stops driving the clock signal on the SCK pin (step S350). At this time, the signal on the SCK received by the flash memory is not the clock signal, and thus the flash memory will not read the signal on the SI pin.

Finally, when the transmission of the data to be transmitted is completed, the embedded controller disables the signal on the SCE# pin, so as to end the write cycle (step S360).

It should be noted that a possible form of the data access method for serial bus has already described in this embodiment, and those skilled in the art should know that the different manufacturers have different design methods for the embedded controller, mainboard, and flash memory. Therefore, the application of the present invention is not limited to this possible form. In other words, as long as the embedded controller directly writes the received signal in the flash memory or directly output the data read from the flash memory to other chips on the mainboard with an interrupted clock signal, it conforms to the spirit of the present invention.

Another embodiment is illustrated, and those skilled in the art can implement the present invention through the teaching of this embodiment.

Figure 4:
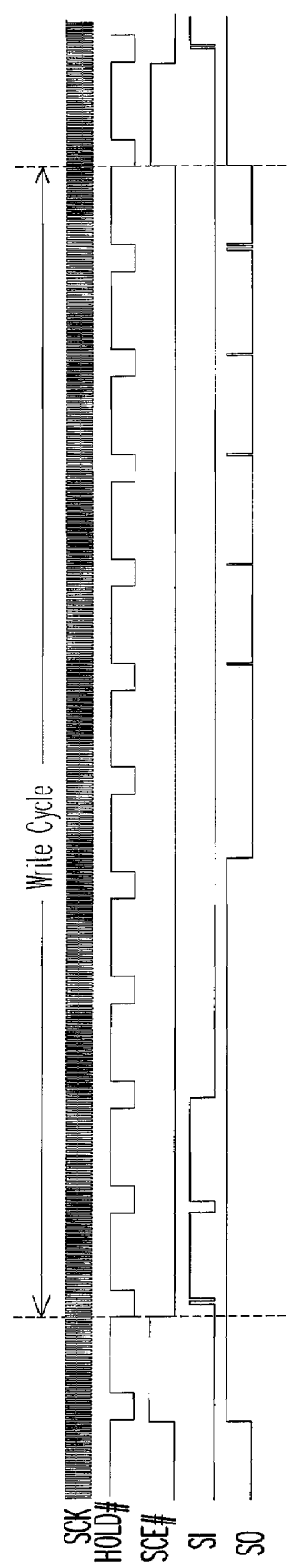
FIG. 4 is a timing diagram of the programming cycle of the SPI according to another embodiment of the present invention.

FIG. 4 is a timing diagram of the programming cycle of the SPI according to another embodiment of the present invention. Referring to FIG. 4, SCK, HOLD#, SCE#, SI, SO are all pins of the SPI. As this embodiment is similar to the embodiment in FIG. 2, the same part will not be described, and only the difference between this embodiment and the embodiment of FIG. 2 is illustrated.

In FIG. 4, a clock signal is, for example, continuously transmitted on the SCK pin. The HOLD# pin is a control pin, for instance. Moreover, only when the embedded controller enables the transmission by the HOLD# pin, the embedded controller transmits the data signal on the SI pin or the SO pin. Consequently, during the write cycle, only when the flash memory reads is enabled by the HOLD# pin, the flash memory reads the data signal on the SI pin according to the clock signal on the SCK pin. During the read cycle, only when the flash memory reads that the HOLD# pin is at the low voltage logic level, the flash memory outputs the data stored therein to the SO pin according to the clock signal on the SCK pin.

Figure 5:
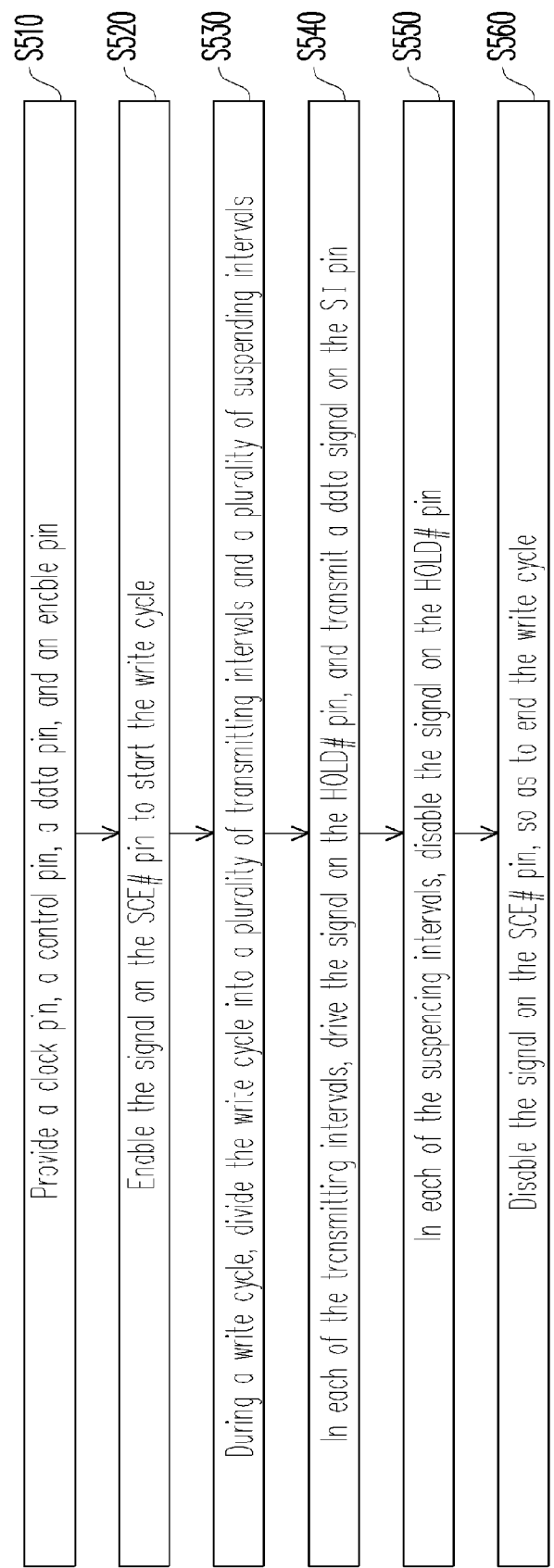
FIG. 5 is a flow chart of the processes of the data access method for serial bus according to another embodiment of the present invention.

Similarly, a data access method for serial bus can also be deduced from this embodiment, and the flow thereof is as shown in FIG. 5. FIG. 5 is a flow chart of the processes of the data access method for serial bus according to another embodiment of the present invention. Referring to FIGS. 4 and 5, first, a clock pin, a control pin, a data pin, and an enable pin are provided (step S510). The clock pin is, for example, the SCK pin in FIG. 4. The control pin is, for example, the HOLD# pin in FIG. 4. The data pin is, for example, the SI and SO pins in FIG. 4. The enable pin is, for example, the SCE# pin in FIG. 4. For the convenience of illustration, the embedded controller, for example, writes data in the flash memory, but those of ordinary skill in the art should know that the data access method for serial bus of this embodiment can also be used for the embedded controller to read data in the flash memory.

Next, the embedded controller enables the signal on the SCE# pin, so as to start the write cycle (or referred to as programming cycle) (step S520). In FIG. 4, the method for the embedded controller to enable the signal on the SCE# pin is, for example, placing the signal at a low voltage logic level.

Then, during a write cycle, the write cycle is divided into a plurality of transmitting intervals and a plurality of suspending intervals (step S530). In each of the transmitting intervals, the embedded controller drives the signal on the HOLD# pin (in FIG. 4, the method for the embedded controller to drive the signal on the HOLD# pin is, for example, placing the signal at a low voltage logic level), and transmits a data signal on the SI pin (step S540). At this time, the flash memory detects that the HOLD# pin is at the low voltage logic level, and reads the data signal on the SI pin though the clock signal on the SCK pin.

On the contrary, in each of the suspending intervals, the embedded controller disables the transmission by the HOLD# pin. At this time, the flash memory detects that the HOLD# pin is at the high voltage logic level, and will not read the signal on the SI pin.

Finally, when the transmission of the data to be transmitted is completed, the embedded controller disables the signal on the SCE# pin, so as to end the write cycle (step S560).

In view of the above, the data access method for serial bus provided by the present invention can write data in the flash memory or read data from the flash memory through an interrupted clock signal, such that the embedded controller can directly write the received data in the flash memory, or directly output the data read from the flash memory, thus avoiding using registers. In other words, the present invention avoids the design of registers on hardware of the embedded controller, thus reducing the cost of the embedded controller and the area of the integrated circuit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data access method for serial bus, comprising:
   providing a clock pin and a data pin;
   during a write/read cycle, dividing the write/read cycle into a plurality of transmitting intervals and a plurality of suspending intervals;
   in each of the transmitting intervals, transmitting a clock signal on the clock pin, and transmitting a data signal on the data pin; and
   in each of the suspending intervals, stop transmitting the clock signal on the clock pin.

2. The data access method for serial bus as claimed in claim 1, further comprising:
   providing an enable pin;
   starting the write/read cycle when a signal on the enable pin is enabled; and
   ending the write/read cycle when the signal on the enable pin is disabled.

3. The data access method for serial bus as claimed in claim 2, wherein the serial bus is connected to an embedded controller and a flash memory.

4. The data access method for serial bus as claimed in claim 3, wherein the clock signal on the clock pin is driven by the embedded controller.

5. The data access method for serial bus as claimed in claim 3, further comprising the flash memory reading the data signal by using the clock signal, when the signal on the enable pin is enabled and the clock signal is transmitted on the clock pin.

6. The data access method for serial bus as claimed in claim 1, wherein the serial bus comprises a Serial Peripheral Interface (SPI).

7. A data access method for serial bus, comprising:
   providing a clock pin, a data pin, and a control pin, wherein a clock signal is continuously transmitted on the clock pin;

during a write/read cycle, dividing the write/read cycle into a plurality of transmitting intervals and a plurality of suspending intervals;
in each of the transmitting intervals, enabling a signal on the control pin, and transmitting a data signal on the data pin; and
in each of the suspending intervals, disabling the signal on the control pin.

8. The data access method for serial bus as claimed in claim 7, further comprising:
providing an enable pin;
starting the write/read cycle when a signal on the enable pin is enabled; and
ending the write/read cycle when the signal on the enable pin is disenabled.

9. The data access method for serial bus as claimed in claim 8, wherein the serial bus is connected to an embedded controller and a flash memory.

10. The data access method for serial bus as claimed in claim 9, wherein the signal on the control pin is driven by the embedded controller.

11. The data access method for serial bus as claimed in claim 10, further comprising the flash memory reading the data signal by using the clock signal, when the signals on the enable pin and the control pin are enabled simultaneously.

12. The data access method for serial bus as claimed in claim 7, wherein the serial bus comprises a SPI.

* * * * *